3,190,741
PROCESS FOR PRODUCING A SLOW-ACTING NITROGENOUS FERTILIZER MIXTURE CONTAINING CROTYLIDENEDIUREA
Hans Brandeis, Ludwigshafen (Rhine), Harro Petersen, Mannheim, and Rolf Fikentscher, Ludwigshafen (Rhine) Germany, assignors to Badische Anilin- & Soda-Fabrik Aktiengesellschaft, Ludwigshafen (Rhine), Germany
No Drawing. Filed July 9, 1963, Ser. No. 293,830
Claims priority, application Germany, July 18, 1962, B 68,080
3 Claims. (Cl. 71—28)

This invention relates to the manufacture of mixture containing crotylidinediurea. More specifically, the invention relates to the manufacture of mixtures comprising crude crotylidenediurea low in nitrogen compounds capable of being split off by urease.

Crotonylidenediurea is known to be a valuable nitrogen depot fertilizer (U.S. patent specification No. 3,054,669). This compound may be prepared by known methods from crotonaldehyde and urea (U.S. patent specification No. 2,264,400) and also from acetaldehyde and urea (Monatshefte für Chemie, 92, 31 (1961)).

According to the process described in the last-mentioned literature reference, crotonylidenediurea is formed from 2 moles of acetaldehyde and 2 moles of urea in the presence of hydrochloric acid according to the equation:

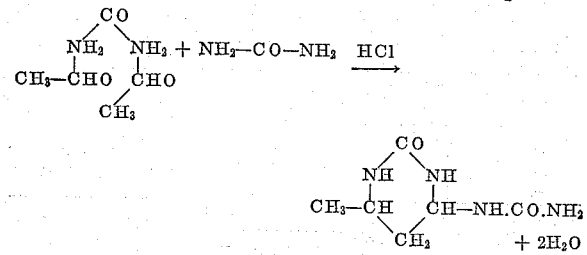

The yield is 70% of the theory.

In the investigation of crotonylidenediurea in respect of nitrogen capable of being split off by urease by known methods it has been found that crotonylidenediurea twice recrystallized from water has a content of nitrogen capable of being split off by urease of 0% from a cold solution and 0.72% from a hot solution, in each case with reference to the total nitrogen. The nitrogen capable of being split off with urease may be regarded as a measure of the readily decomposable nitrogen without depot fertilizer action. Thus for example the nitrogen of urea, which has no depot fertilizer action whatever, is decomposed to the extent of 100% immediately after adding urease.

Owing to secondary reactions, the reaction of acetaldehyde with urea to form crotonylidenediurea in the theoretical molar ratio of 1:1 does not proceed quantitatively. If acetaldehyde and urea are reacted in the molar ratio 1:1 in aqueous solution in the presence of a strong acid to form crotonylidenediurea, the acid neutralized and the resultant solid substance dried together with the liquid, a quantitative yield is obtained, but a considerable proportion of nitrogen compounds capable of being split off by urease is always determined in the dry product. The byproducts which are not present as crotonylidenediurea have no depot fertilizer action because they are readily degraded by urease. Therefore in the production of crotonylidenediurea from urea and acetaldehyde in the theoretical molar ratio, a quantitative yield is accomplished by contamination of the crotonylidenediurea by substances without nitrogen depot fertilizer action. This is a great disadvantage because crotonylidenediurea is commonly used in much larger amounts than mineral nitrogen fertilizers and because in high dosage the substances containing nitrogen which is readily split off by ureas cause damage to plants if they are used together with crotonylidenediurea as slow-acting fertilizers.

It is an object of the present invention to provide crude crotonylidenediurea which contains only small amounts of nitrogen compounds capable of being split off by urease and which will not damage plant when used in large dosages as a slow-acting nitrogenous fertilizer. Another object of the invention is to provide crotonylidenediurea which will not damage plant in large dosages even if it is dried together with all or part of the mother liquor formed in the manufacture. Other objects and advantages of the invention will become apparent from the following detailed description of our invention. These objects and advantages are achieved by reacting urea and acetaldehyde in the molar ratio of from 1:1.01 to 1:1.5, preferably from 1:1.05 to 1:1.25, in a solution kept at elevated temperature and with a pH value kept at least at the end of the reaction at a value less than 3, preferably of 1.5 to 2.5, adjusting a pH value of between 5 and 9, preferably between 6 and 8, after the reaction, and drying the solid substances formed together with the whole or a part of the liquid present in the reaction product.

Evaporation of solid substance and mother liquor may be carried out in a conventional manner, for example, by spraying the liquid containing the reaction products in a spray dryer or by drying on steam heated rollers. The content in the reaction product of nitrogen capable of being split off with urease differs according to the reaction conditions. In every case, however, the mixtures according to this invention contain less nitrogen capable of being split off with urease than mixtures which have been obtained under corresponding reaction conditions with a molar ratio of urea to acetaldehyde of 1:1. In other respects the possibilities for affecting the content of nitrogen capable of being split off with urease by varying the reaction conditions are only very limited and considerably less than the possibilities offered by varying the ratio of urea to acetaldehyde.

It is advantageous to carry out the reaction of urea with acetaldehyde in aqueous solution between 30° and 100° C., preferably between 50° and 80° C., because the reaction proceeds only very sluggishly at lower temperatures and because at higher temperatures there is a risk of decomposition of the crotonylidenediurea. The reaction proceeds very rapidly at 100° C. and at temperatures of 50° to 80° C. the precipitation of crotonylidenediurea begins after about ten minutes. Long reaction periods are required for practically complete conversion. The reaction is carried out at a pH value of less than 3, preferably at 1.5 to 2.5. It is possible to carry out first a condensation with a small addition of acid, i.e., at pH values above 3, and then to carry the condensation to completion at pH values less than 3. Hydrochloric acid, sulfuric acid, nitric acid and p-toluenesulfonic acid are examples of acids which may be used. It is preferred to use sulfuric acid on the one hand to avoid corrosion and on the other hand because sulfuric acid causes less decomposition at elevated temperature of crotonylidenediurea already formed. The condensation of urea with acetaldehyde may be achieved by adding large amounts of acid, if necessary with an increase in the reaction temperature. It is however also possible to carry out the reaction at high temperature in the presence of less acid. In every case the reaction must be carried to completion at a pH value less than 3. The addition of urea, acetaldehyde and acid may be in any order. A portion of the acetaldehyde may be added to the reaction mixture at any time after the beginning of the reaction instead of the beginning. The condensation of urea with acetaldehyde may be carried out in a particularly economical way by a continuous method. The content of nitrogen capable of being split off with urease is further decreased by heating the reaction product to an elevated temperature after the reaction.

Nitrogen fertilizers having definite proportions of readily soluble nitrogen and difficulty soluble nitrogen can be obtained from acetaldehyde and urea according to the process described in German patent specification No. 972,352. The condensation products prepared by this method are however of a different character from the mixtures according to the present invention. A condensation product having nitrogen contents capable of being split off with urease of 3.2% from a cold solution and 83.8% from a hot solution is obtained according to the said prior art method. The high value for the hot solution indicates that the acetaldehyde in this condensation product is combined only loosely and is capable of being readily split off hydrolytically. Urea is thus set free and is degraded by the urease.

The invention is further illustrated by the following examples in which parts are by weight.

Example 1

500 parts of water is mixed with 74.5 parts of concentrated sulphuric acid (100%) and 600 parts of urea is dissolved therein (pH 1.6). While stirring and cooling the solution, 440 parts of acetaldehyde is allowed to flow in (molar ratio of urea to acetaldehyde=1:1, the temperature not being allowed to rise above 20° C. The whole is then heated to 40° C. within five minutes, stirred for thirty minutes at the same temperature and then heated to 70° C. within five to ten minutes. Crotonylidenediurea begins to precipitate shortly after the temperature of 70° C. has been reached. The whole is stirred for thirty minutes at 70° C., then cooled to 30° C. and stirred for four hours at 30° C. A sample is then taken, neutralized with 20% potassium hydroxide solution and dried until its weight is constant over sulphuric acid or phosphorus pentoxide in vacuo at room temperature. The total nitrogen and the nitrogen capable of being split off with urease from the cold and hot solution are determined with reference to the total nitrogen.

Further samples are prepared by the same process but using, instead of 440 parts of acetaldehyde, the following amounts of acetaldehyde, corresponding to the molar ratio of urea to acetaldehyde indicated:

| Parts of acetaldehyde: | Molar ratio: urea to acetaldehyde |
|---|---|
| 462 | 1:1.05 |
| 484 | 1:1.1 |
| 506 | 1:1.15 |
| 528 | 1:1.2 |
| 550 | 1:1.25 |
| 572 | 1:1.3 |
| 616 | 1:1.4 |
| 660 | 1:1.5 |

The following table gives the analytical values of various mixtures in the production of all of which the whole of the reaction products, i.e., solid substances and the entire liquid, are evaporated and dried:

| Molar ratio of urea to acetaldehyde | Total N in percent | Percentage of total N capable of being split off with urease | |
|---|---|---|---|
| | | Cold | Hot |
| 1:1 | 30.20 | 12.45 | 15.89 |
| 1:1.05 | 29.52 | 8.27 | 12.35 |
| 1:1.1 | 29.36 | 5.92 | 8.26 |
| 1:1.15 | 29.04 | 5.31 | 6.36 |
| 1:1.2 | 28.60 | 3.92 | 4.66 |
| 1:1.25 | 28.08 | 2.85 | 4.12 |
| 1:1.3 | 26.60 | 2.43 | 4.55 |
| 1:1.4 | 26.36 | 2.56 | 3.68 |
| 1:1.5 | 25.80 | 2.64 | 4.65 |

This table clearly shows the marked decrease in the content of nitrogen capable of being split off by urease, especially in hot solution, when using more than 1.01 moles of acetaldehyde to each mole of urea in the initial mixture.

Example 2

600 parts of urea is dissolved in a mixture of 550 parts of water and 74.5 parts of 45.6% sulfuric acid. 484 parts of acetaldehyde (molar ratio of urea to acetaldehyde=1:1.1) is allowed to flow in while stirring and cooling at a temperature not exceeding 20° C. The whole is heated to 40° C., kept for fifteen minutes at this temperature, heated to 70° C. and stirred at this temperature for one hour. The whole is then cooled to room temperature and neutralized with 262 parts of 20% potassium hydroxide solution. A sample of the pulp is dried at room temperature over sulfuric acid or phosphorus pentoxide in vacuo until its weight is constant. A portion of the sample dried at room temperature is heated for one hour at 120° C.; a weight loss of 2% takes place. Finally a sample of the pulp (solid substance and liquid) is dried by heating for two hours at 120° C. The following values are obtained for the nitrogen capable of being split off with urease.

| Method of drying | Percentage of total N capable of being split off by urease | |
|---|---|---|
| | Cold | Hot |
| Dried at room temperature | 8.83 | 10.56 |
| Heated for one hour at 120° C. after drying | 7.69 | 8.69 |
| Dried for two hours at 120° C | 7.76 | 8.03 |

Example 3

A solution of 180 parts of urea in 168 parts of water in a stirred vessel fitted with a reflux condenser with cooling brine is acidified with 16.5 parts of 45.6% sulfuric acid and then 146 parts of acetaldehyde is added with stirring. The molar ratio of urea to acetaldehyde is 1:1.1. The acetaldehyde is added during the course of about fifteen minutes. The reaction temperature of the solution is kept between 70° and 72° C. by constant cooling. The reaction product begins to precipitate after a short time. The whole is stirred for one hour at 70° to 72° C. and the suspension obtained is cooled to room temperature and neutralized with 29 parts of 40% potassium hydroxide solution. The pulp is sprayed into a spray tower at an inlet temperature of the air of 325° to 330° C. and an outlet temperature of 110° to 120° C. A product is obtained having a total nitrogen content of 29.6% of which 8.9% is split off by urease from a cold solution and 11.7% from a hot solution.

A product prepared in the same way for comparison using 132 parts of acetaldehyde instead of 146 parts, i.e., a molar ratio of urea to acetaldehyde of 1:1, gives a spray product having a total nitrogen content of 32% of which 10.3% is split off by urease from a cold solution and 19.3% from a hot solution.

We claim:
1. A process for producing a slow-acting nitrogenous fertilizer mixture containing crotylidenediurea and other condensation products of urea and acetaldehyde, said process comprising reacting at 30–100° C. urea and acetaldehyde in a molar ratio of 1:1.05 to 1:1.5, respectively, in water maintained at an acid pH of at least 1.5, maintaining the pH of the reaction mixture at 1.5–3.0 toward the end of the reaction and thereby forming insoluble condensation products of urea and acetaldehyde consisting essentially of crotylidenediurea in a motor liquor, then adjusting the pH of the motor liquor to a value in the range of 5–9, and then drying the insoluble condensation products formed in the reaction together with at least a portion of said adjusted mother liquor in an amount sufficient to produce crude crotylidenediurea with only small amounts of nitrogen compounds capable of being split off by cold urease solution in the range of 2.43% to 8.9%.

2. A process as claimed in claim 1 wherein said drying is a spray-drying of said insoluble condensation products and said mother liquor.

3. A process as claimed in claim 1 wherein said last-mentioned pH is in the range of 6–8.

References Cited by the Examiner
UNITED STATES PATENTS 2,541,005  2/51  Oldham et al. _____ 71—28
3,054,669  9/62  Jung et al. _____ 71—28

DONALL H. SYLVESTER, *Primary Examiner.*
ANTHONY SCIAMANNA, *Examiner.*

UNITED STATES PATENT OFFICE
CERTIFICATE OF CORRECTION

Patent No. 3,190,741　　　　　　　　　　　　　　　　　　　　June 22, 1965

Hans Brandeis et al.

It is hereby certified that error appears in the above numbered patent requiring correction and that the said Letters Patent should read as corrected below.

Column 5, lines 11 and 12, for "motor", each occurrence, read -- mother --.

Signed and sealed this 30th day of November 1965.

(SEAL)
Attest:

ERNEST W. SWIDER
Attesting Officer

EDWARD J. BRENNER
Commissioner of Patents